United States Patent
Stephenson

[11] Patent Number: 5,871,345
[45] Date of Patent: Feb. 16, 1999

[54] PERCUSSIVELY FIRED FLASH LAMP ARRAY

[75] Inventor: Stanley W. Stephenson, Spencerport, N.Y.

[73] Assignee: Eastman Kodak Company, Rochester, N.Y.

[21] Appl. No.: 788,005

[22] Filed: Jan. 24, 1997

[51] Int. Cl.⁶ .............................. F21K 5/00; G03B 15/03
[52] U.S. Cl. ................... 431/365; 431/357; 431/359; 431/361; 431/360; 362/11; 362/12; 396/155; 396/191; 396/192
[58] Field of Search ................... 431/357–362, 431/364, 365; 396/155, 191, 192; 362/10–15; 102/204

[56] References Cited

U.S. PATENT DOCUMENTS

| | | | |
|---|---|---|---|
| 1,179,335 | 4/1916 | Porter | 431/364 |
| 1,780,509 | 11/1930 | Skinner . | |
| 2,197,733 | 4/1940 | Schwarze | 431/361 |
| 2,279,880 | 4/1942 | DeMargitta | 431/358 |
| 2,280,048 | 4/1942 | Schwarze | 431/358 |
| 2,386,672 | 10/1945 | Fink | 431/360 |
| 2,393,711 | 1/1946 | Schwarze | 67/31 |
| 3,280,601 | 10/1966 | Ostrow | 431/365 |
| 3,439,992 | 4/1969 | Shaffer et al. | 431/93 |
| 3,511,586 | 5/1970 | Kopelman et al. | 431/93 |
| 3,540,820 | 11/1970 | Shaffer | 431/93 |
| 3,706,521 | 12/1972 | Kopelman et al. | 431/93 |
| 3,751,656 | 8/1973 | Buckler et al. | 240/1.3 |
| 3,873,260 | 3/1975 | Cote | 431/95 |
| 4,055,759 | 10/1977 | Bouchard et al. | 431/361 |
| 4,154,569 | 5/1979 | van Werkhoven | 91/357 |
| 4,233,023 | 11/1980 | Johnson et al. | 431/362 |
| 4,347,053 | 8/1982 | Fohl et al. | 431/359 |

FOREIGN PATENT DOCUMENTS

| | | | |
|---|---|---|---|
| 14821 | 10/1933 | Australia | 431/358 |
| 781865 | 5/1935 | France . | |
| 679735 | 8/1939 | Germany | 431/365 |

*Primary Examiner*—Ira S. Lazarus
*Assistant Examiner*—David Lee
*Attorney, Agent, or Firm*—Thomas H. Close

[57] ABSTRACT

A compact flash lamp array includes a housing defining a plurality of cavities. Each cavity has a light emitting opening and a primer vent opposite the light emitting opening. A combustible mass is deposited in each cavity over the primer vent and a primer mass is deposited on the outside of the housing over each primer vent. A primer is cover secured over each primer mass, and a sheet of transparent material is bonded over the cavities in the housing.

17 Claims, 2 Drawing Sheets

PERCUSSIVELY FIRED FLASH LAMP ARRAY

CROSS-REFERENCE TO RELATED APPLICATIONS

The present application is related to U.S. application Ser. No. 08/769,338, filed Dec. 19, 1996, by Stanley W. Stephenson, and entitled, "Improved Photoflash Particle Mixture"; U.S. application Ser, No. 08/744,782, filed Nov. 6, 1996, by Stanley W. Stephenson, and entitled, "Photo Flash Lamp Array", now U.S. Pat. No. 5,720,610, issued Feb. 24, 1998; and U.S. application Ser. No. 08/788,533, filed Jan. 24, 1997, by Stanley W. Stephenson, and entitled, "Flash Lamp Array With Porous Vent".

FIELD OF THE INVENTION

The invention relates generally to the field of photography, and in particular to a compact array of flash lamps containing combustible material. More particularly to a percussively fired flash lamp array.

BACKGROUND OF THE INVENTION

Currently available single use cameras with flash illumination are provided with electronic flash. The electronic flash unit is relatively expensive, representing a significant portion on the overall cost of the camera, and requires a relatively large capacity battery for operation. Although the electronic flash unit may be recovered and recycled a number of times, thereby reducing the effective cost of the electronics, the battery is replaced each time the camera is re-manufactured to insure proper operation of the flash unit. It has been observed that an array of chemical flash lamps could be an attractive alternative to electronic flash in single use cameras and related applications.

U.S. Pat. No. 4,347,053 issued Aug. 31, 1982, to Fohl et al. discloses a flash illumination assembly having a plurality of electrically fired flash lamps located in a circular housing. The combustion products from the individual flash lamps are vented into a common central expansion chamber. The electronically fired flash lamps have the drawback of requiring a source of electricity such as a battery for ignition.

U.S. Pat. No. 3,751,656 issued Aug. 7, 1973, to Buckler et al. discloses percussively fired flash illumination devices that are formed of transparent sheet plastic, wherein a pair of opposed walls are marginally secured together to define a first cavity for retaining a combustible mixture. In one embodiment the pyrotechnic material is ignited by a primer body contained in a second cavity communicating with the first cavity by a small passage. The flash illumination device is fired by striking the primer through the wall of the second cavity with a firing pin which crushes the second cavity against an anvil to ignite the primer. Combustion products from the primer ignite the combustible mixture through the small passage. These flash illumination devices do not readily lend themselves to a compact array such as would be required for a single use camera.

U.S. Pat. No. 3,439,992 issued Apr. 22, 1969, to J. W. Shaffer et al. discloses a flash illumination device having a cup shaped base for containing the primer material and an anvil having passages for allowing the combustion products from the primer to ignite a combustible mass contained in a lamp envelope. The cup shaped base is sealed to the lamp envelope by crimping. Although these lamps could be formed into an array, the resulting structure is relatively complex, and therefore expensive to manufacture.

There is a need therefore for an improved percussively fired array of flash lamps.

SUMMARY OF THE INVENTION

The present invention is directed to overcoming one or more of the problems set forth above. Briefly summarized, according to one aspect of the present invention, a compact flash lamp array includes a housing defining a plurality of cavities. Each cavity has a light emitting opening and a primer vent opposite the light emitting opening. A combustible mass is deposited in each cavity over the primer vent and a primer mass is deposited on the outside of the housing over each primer vent. A primer is cover secured over each primer mass, and a sheet of transparent material is bonded over the cavities in the housing.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides an inexpensive, reliable, easy to manufacture flash assembly that effectively isolates the primers of the flash lamps from each other in a low cost compact manner.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
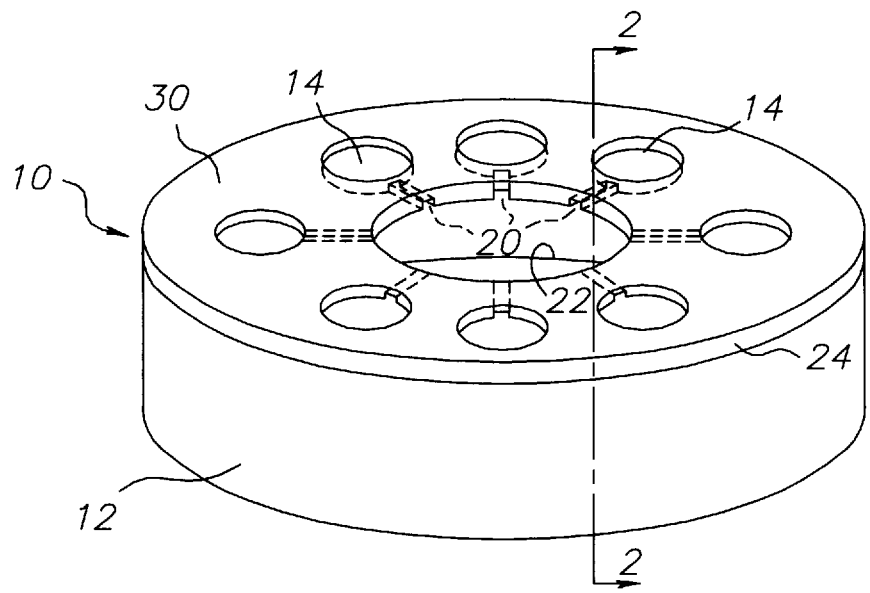
FIG. 1 is a is a perspective view of a flash lamp array according to the present invention.
Figure 2:
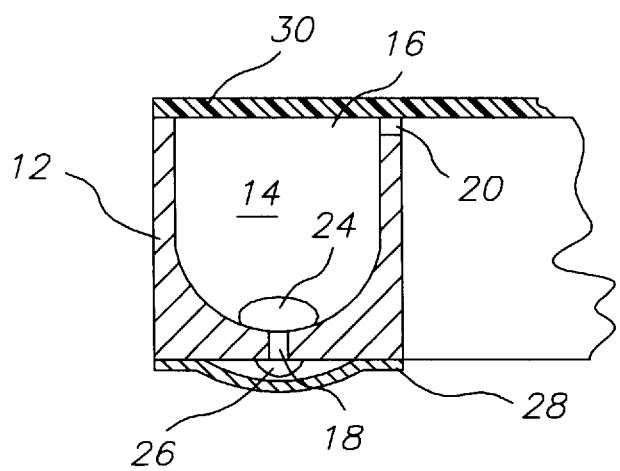
FIG. 2 is a cross sectional view of the flash lamp array shown in FIG. 1, taken along line 2—2.

Referring to FIGS. 1 and 2, the flash lamp array 10 of the present invention includes a circular housing 12 defining a plurality of cavities 14. The circular housing 12 is preferably chemically polished die cast aluminum. Each cavity 14 is between 0.5 and 1.5 cc in volume and defines a light emitting opening 16, a primer vent 18 and an exhaust vent 20. The primer vent 18 is located in the center of the bottom of the cavity 14 opposite the light emitting opening 16. The exhaust vent 20 is located at the side of the cavity 14 and vents into a central exhaust chamber 22.

A combustible mass 24 is deposited at the bottom of each cavity 14. Preferably, the combustible mass 24 is a mixture of coarsely powdered zirconium (−320 sieve), finely powdered zirconium (5 $\mu$m zirconium dust), an oxidizer such as a chlorate or perchlorate (preferably −200 and +400 sieve potassium perchlorate), and polymeric binder (preferably polyacrilamide PAA) all dispersed in water. A mass of 22 to 40 mg (preferably 35 mg) of the resulting slurry are deposited onto the cavity 14 over the primer vent 18 and oven dried at 90° C. for 24 hours. The bottom of the cavity 14 is preferably curved to form the slurry into a compact combustible mass 24 at the bottom of cavity 14. Restricting the combustible mass in this way has been found to significantly increase the light output of the flash array.

A primer mass 26 is deposited on the back of the housing 12 over each primer vent 18. Preferably the primer mass 26 is a mixture of red phosphorus, potassium chlorate, and silicone dioxide powders in a ratio of 1:2:3. An equal mass of water containing 1% PAA binder is combined with the powder mixture to form a primer slurry. 2 to 10 mg of the primer slurry is applied over primer vent 18 and dried at 90° C. for 30 minutes. When dried, the primer mass 26 varies in height between 0.003 and 0.012 inches. Housing 12 must be sufficiently hard to perform as an anvil for the primer mass 26. It has been found that either aluminum or an engineering plastic such as polycarbonate is sufficiently hard for this purpose.

A primer cover 28 comprising a deformable sheet of material is secured over each primer mass 26 to direct the combustion products of the primer mass 26 through primer vent 18 into cavity 14 to ignite combustible mass 24. Primer cover 28 serves to hold primer mass 26 in place over primer vent 18. Since the height of primer mass 26 varies, primer cover 28 must be malleable enough to accommodate the variations in height while securing primer mass 26, without exerting such force on primer mass 26 that it is detonated. The primer covers 28 are formed of a material that can resist extremely high temperatures and have sufficient thickness to resist rupture from the shock and pressure from detonation of primer mass 26. Primer covers 28 must also be able to efficiently transfer impact energy from a firing pin employed to ignite the primer mass 26. The adhesive employed to hold the primer cover over the primer mass must have sufficient adhesion to housing 12 to resist failure from pressures resulting form ignition of primer mass 26.

In one embodiment, the primer cover is an adhesive backed 2 mil aluminum foil (e.g. Scotch 1170 brand aluminum tape available from the 3M Corporation). The adhesive backed foil may be applied in individual patches over each primer mass 26, or a single sheet of adhesive backed foil is applied to the back of the housing and secured over the primer masses 26 to separately enclose each mass. The adhesive sheet is applied to the back of the housing with a die that is relieved in the areas of the primer masses 26 which allows the sheet to deform to form tent like covers over the primer masses 26. Alternatively, 1.4 mil adhesive backed copper foil (e.g. Scotch 1181 brand copper tape available from the 3M Corporation) may be used to form primer covers 28. Alternatively, an adhesive such as silicone rubber or an epoxy is applied to the back of housing 12 and a metallic foil such as copper or aluminum is secured over the primer masses 26. Preferably, the metal foil is annealed to provide the ductility necessary to form a tent-like shape over the primer masses 26 without detonating the masses. Such foil is preferably 2 mil thick aluminum or 1.4 mil thick copper.

A sheet of transparent material 30 is bonded to the top of the housing 12 to cover the cavities 14 in housing 12 and complete the enclosures for the flash lamp array 10. The transparent sheet 30 may be, for example, 1 mm thick glass, 0.5 mm thick glass coated plastic with the glass coating on the inside of the chamber, or 0.5 mm thick acrylic. The transparent sheet 30 is bonded to the housing 12 with an adhesive such as epoxy or silicone rubber.

Figure 3:
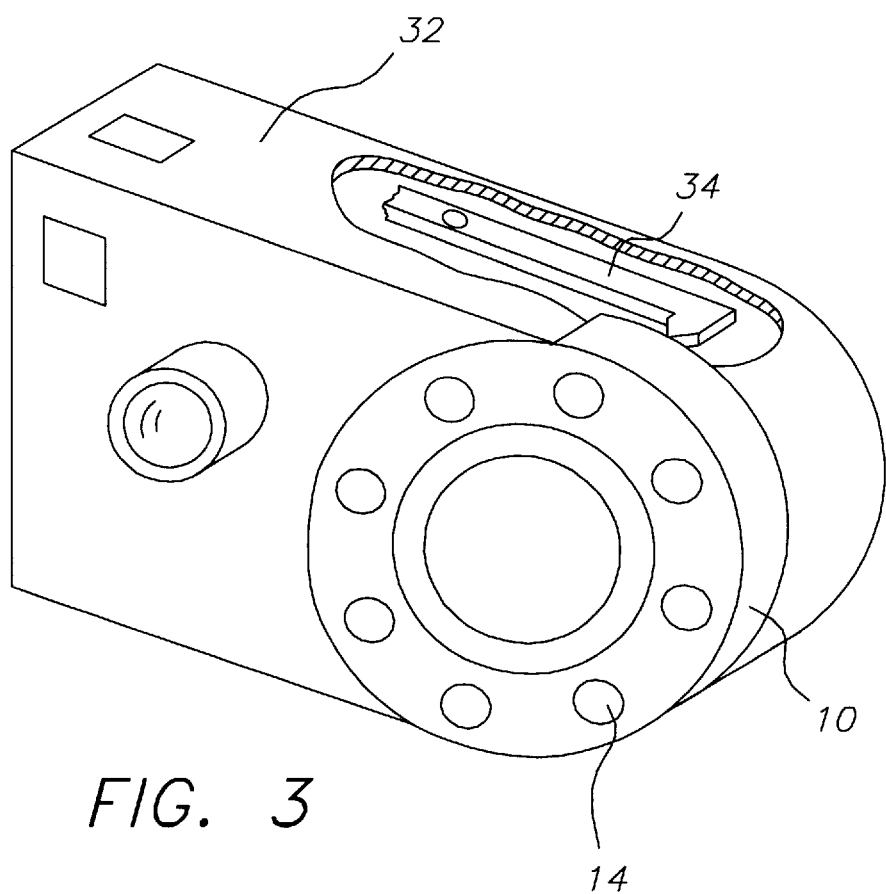
FIG. 3 is a perspective view of a single use camera including a flash array according to the present invention, partially broken away to show the flash firing pin.

As shown in FIG. 3, the flash lamp array 10 according to the present invention may be incorporated in a single use camera 32. The single use camera includes a flash firing pin 34 activated in a conventional manner by a high energy lever (not shown) associated with a shutter mechanism in the camera. The firing pin 34 is adapted to strike the primer cover 28 associated with a flash cavity 14 located adjacent the firing pin 34 to ignite the associated primer mass 26. The camera 32 includes a mechanism (not shown) to rotate flash lamp array 10 after each exposure of the camera 32 to place an unfired primer adjacent the firing pin 34.

The invention has been described with reference to a preferred embodiment. However, it will be appreciated that variations and modifications can be effected by a person of ordinary skill in the art without departing from the scope of the invention.

I claim:

1. A compact flash lamp array, comprising:

a) a housing defining a plurality of cavities, each cavity having a light emitting opening and a primer vent opposite the light emitting opening;

b) a combustible mass deposited in each cavity over the primer vent;

c) a primer mass deposited directly on the outside of the housing over each primer vent, whereby the housing itself functions as an anvil for the primer mass;

d) a primer cover secured over each primer mass to hold the primer mass in place over the primer vent; and e) a sheet of transparent material bonded over the cavities in the housing.

2. The compact photoflash lamp array claimed in claim 1, wherein the primer cover is a deformable sheet of material secured over the primer mass to enclose the primer mass in a tent-like structure.

3. The compact photoflash lamp array claimed in claim 1, wherein the primer cover is a single sheet of material secured over a plurality of the primer masses to separately enclose each primer mass.

4. The compact flash lamp array claimed in claim 2, wherein the primer cover is a metallic foil of copper or aluminum.

5. The compact flash lamp array claimed in claim 4, wherein the metallic foil is between 0.001 and 0.010 inches thick.

6. The compact flash lamp array claimed in claim 5, wherein the metallic foil is annealed.

7. The compact flash lamp array claimed in claim 5, wherein the metal foil has an adhesive backing.

8. The compact flash lamp array claimed in claim 1, wherein the housing further defines a central venting chamber and an exhaust vent from each cavity into each venting chamber.

9. The compact flash lamp array claimed in claim 1, wherein the housing is polished aluminum.

10. The compact flash lamp array claimed in claim 1, wherein the housing is reflective metal coated plastic.

11. The compact flash lamp array claimed in claim 1, wherein the sheet of transparent material is glass.

12. The compact flash lamp array claimed in claim 1, wherein the sheet of transparent material is clear acrylic plastic.

13. The compact flash lamp array claimed in claim 1, wherein the sheet of transparent material is glass coated plastic.

14. The compact flash lamp array claimed in claim 1, wherein the combustible mass is finely divided zirconium powder and potassium perchlorate in polymeric binder.

15. The compact flash lamp array claimed in claim 1, wherein the primer mass is a mixture of red phosphorus, potassium chlorate, and silicone dioxide powders in a ratio of 1:2:3.

16. The compact flash lamp array claimed in claim 1, wherein the flash lamp array is an integral part of a single use camera.

17. The compact flash lamp array claimed in claim 1, wherein the primer cover is secured over the primer mass by an adhesive.

\* \* \* \* \*